United States Patent
Naito et al.

(10) Patent No.: US 7,981,506 B2
(45) Date of Patent: Jul. 19, 2011

(54) PLASTIC LENS AND METHOD OF MANUFACTURING A PLASTIC LENS

(75) Inventors: Shuji Naito, Nagano ken (JP); Hidenori Komai, Nagano ken (JP); Jun Kinoshita, Nagano ken (JP); Yusuke Kutsukake, Nagano ken (JP); Katsuyoshi Takeshita, Minowa-machi (JP)

(73) Assignee: Seiko Epson Corporation, Tokyo (JP)

( * ) Notice: Subject to any disclaimer, the term of this patent is extended or adjusted under 35 U.S.C. 154(b) by 770 days.

(21) Appl. No.: 11/413,017

(22) Filed: Apr. 28, 2006

(65) Prior Publication Data

US 2006/0251884 A1   Nov. 9, 2006

(30) Foreign Application Priority Data

Apr. 28, 2005   (JP) ................. 2005-131034

(51) Int. Cl.
*B32B 27/40* (2006.01)
*B32B 27/18* (2006.01)
*B32B 5/16* (2006.01)

(52) U.S. Cl. ..... 428/328; 427/164; 428/331; 428/425.5; 428/451

(58) Field of Classification Search .................. 428/328, 428/331, 425.5, 451
See application file for complete search history.

(56) References Cited

U.S. PATENT DOCUMENTS

| | | | |
|---|---|---|---|
| 5,393,607 A | 2/1995 | Kawasaki et al. | |
| 6,040,053 A * | 3/2000 | Scholz et al. | 428/412 |
| 6,703,131 B1 | 3/2004 | Kayanoki | |
| 7,604,866 B2 * | 10/2009 | Ohashi et al. | 428/446 |
| 2004/0105156 A1 | 6/2004 | Kayanoki | |
| 2004/0209084 A1 * | 10/2004 | Yamaya et al. | 428/421 |
| 2004/0253427 A1 * | 12/2004 | Yokogawa et al. | 428/212 |
| 2006/0078723 A1 * | 4/2006 | Kutsukake et al. | 428/304.4 |

FOREIGN PATENT DOCUMENTS

| | | |
|---|---|---|
| JP | 8-175887 A | 7/1996 |
| JP | 10-298451 A | 11/1998 |
| JP | 11-310755 A | 11/1999 |
| JP | 2001-166104 A | 6/2001 |
| JP | 2003-195003 A | 7/2003 |
| JP | 2004-264778 A | 9/2004 |
| JP | 2005-010618 A | 1/2005 |
| JP | 2005-043572 A | 2/2005 |
| WO | WO 00/78879 A1 | 12/2000 |
| WO | WO 2004/113966 A1 * | 12/2004 |
| WO | WO 2006/095469 A1 | 9/2006 |

* cited by examiner

*Primary Examiner* — D. S Nakarani

(74) *Attorney, Agent, or Firm* — Sughrue Mion, PLLC

(57) ABSTRACT

The plastic lens has the hard coat layer on a plastic lens base material containing at least sulfur atom and the organic anti-reflection film on the hard coat layer and further has a primer layer between the plastic lens base material and the hard coat layer. The hard coat layer comprises metal oxide particulates at least containing titanium oxide with rutile-type crystal structure and an organic silicon compound expressed by general Formula: $R1SiX13$. The organic anti-reflection film comprises a coating composition at least containing an organic silicon compound expressed by general Formula: $R2nR3mSiX24-n-m$ and silica system particulates of 1 to 150 nm mean particle diameter and has a refractive index which is lower than that of that of the hard coat layer by 0.10 or more.

14 Claims, No Drawings

PLASTIC LENS AND METHOD OF MANUFACTURING A PLASTIC LENS

BACKGROUND

1. Technical Field

The present invention relates to a plastic lens and a method of manufacturing a plastic lens.

2. Related Art

Plastic lenses have rapidly prevailed in the filed of spectacle lenses, and account for a large share thereof, because they are lightweight, excellent in formability, processibility, tinting properties and the like, and are resistant to breakage and highly safe as compared with glass lenses. Also, in recent years, materials having a high refractive index such as thiourethane based resins and episulfide based resins have been developed for the purpose of meeting further needs of reduction in thickness and weight saving. On the other hand, because plastic lenses are readily scratched as compared with glass lenses, a hard coat layer is generally formed on the surface of the plastic lens to improve the surface hardness. Additionally, for the purpose of preventing the surface reflection, an antireflection film is formed by vapor deposition of an inorganic material on the upper face of the hard coat layer, and still further, for the purpose of improving the water-repelling and oil-repelling performances of the surface, an antifouling layer composed of an organic silicon compound containing fluorine is formed on the upper face of the antireflection film. Hence, the plastic lenses have further progressed as highly functional lenses by means of technological innovation of the surface treatment.

However, the plastic lenses involve the problem of low heat resistance, and in particular, as the plastic lens resin material has higher refractive index, the heat resistance is liable to decrease. Additionally, the inorganic antireflection film among the surface-treatment layers, in particular, can not follow the deformation due to thermal expansion of the plastic lent being the substrate. As a consequence, problems of occurrence of fogging and crack may be raised, and such problems tend to be prominent as the plastic lens has higher refractive index.

Meanwhile, the inorganic antireflection film is formed by a vacuum evaporation process, therefore, it generally has a high film density, and has a property to shield the hard coat layer being a substrate layer from factors which may deteriorate the durability of the plastic lens such as oxygen, moisture and ultraviolet light outside of the lens (protective effect). According to such an inorganic antireflection film, even though the hard coat layer was formed as the substrate layer using a coating composition which includes titanium oxide having an anatase crystal structure as a principal component accompanied by low light resistance, the durability can be secured to some extent. In contrast, according to the antireflection film composed of an organic thin film has relatively low film density as compared with the inorganic antireflection film, and has a structure having pores, such a protective effect as that of the inorganic antireflection film can not be achieved. Therefore, when the hard coat layer was formed using a coating composition which includes titanium oxide having the anatase crystal structure as a principal component, the durability becomes so unsatisfactory that the hard coat layer being the substrate layer is demanded to have higher durability.

To meet such demands, techniques to form a hard coat layer using a coating composition which includes metal oxide fine particles including titanium oxide having a rutile crystal structure as a principal component were proposed. Because titanium oxide having low photoactivity is used in this hard coat layer, the durability can be improved as compared with known titanium oxide having an anatase crystal structure, while maintaining high refractive index (for example, see JP-A-11-310755).

However, when an antireflection film composed of an organic thin film was formed on the upper face of the hard coat layer which includes such rutile type titanium oxide, the hard coat layer may not have sufficient durability, and further improvement of the durability is required. Thiourethane based resins and episulfide based resins used in the plastic lens substrates having a high refractive index predominating in recent years have a sulfur atom on its main chain skeleton. This sulfur atom hardly causes an interaction with a polar group such as a silanol group in the organic silicon compound that is present in the hard coat layer, and a property to inhibit the hardening of the hard coat layer itself is found, therefore, achievement of adhesion between the hard coat layer and the plastic lens substrate tended to be difficult. In particular, when an antireflective layer composed of an organic thin film was formed on the upper face of the hard coat layer, the adhesiveness with the plastic lens substrate may be insufficient, and in addition, water and oxygen passed through the organic thin film may deteriorate the hard coat layer. Thus, according to the construction having an antireflective layer composed of the organic thin film was provided on the upper face of the hard coat layer, to achieve sufficient durability (adhesive and protective effect) was difficult.

Furthermore, demands for tinted lenses among the plastic lens for spectacle lenses are great, and in general, tinting of plastic lens substrate by a disperse dye has been carried out. In this instance, the dye is present on the plastic lens substrate surface, therefore, adhesiveness between the hard coat layer and the plastic lens substrate is deteriorated as compared with untinted lenses. The disperse dye present on the plastic lens substrate surface is found to have a property to be altered predominantly by ultraviolet ray or oxygen. Particularly, when an antireflective layer composed of an organic thin film was provided on the upper layer of the hard coat layer, alteration is more likely to occur, which may be the grounds for deterioration of the adhesiveness between the hard coat layer and the plastic lens substrate.

SUMMARY

Accordingly, the invention was made in view of such circumstances, and an advantage of some aspects of the invention is to provide a plastic lens having a hard coat layer with improved durability in optical components having an antireflection film composed of an organic thin film, and a method of manufacturing the plastic lens.

The present inventors found that durability of an optical article having an antireflection film composed of an organic thin film can be improved by providing a primer layer having a particular composition between a plastic lens substrate and a hard coat layer. Accordingly, the present invention was accomplished.

The plastic lens according to an aspect of the invention includes a plastic lens substrate and a hard coat layer on the plastic lens substrate, and an organic antireflection film on the hard coat layer, and is characterized by the plastic lens substrate including at least a sulfur atom, the hard coat layer being a coating film formed with a coating composition which includes at least the following Component A and Component B, the organic antireflection film being a coating film which includes at least the following Component C and Component D, and has a refractive index that is lower than the refractive index of the hard coat layer by 0.10 or more, and the plastic lens having a primer layer between the plastic lens substrate and the hard coat layer.

Component A: metal oxide fine particles including titanium oxide having a rutile crystal structure.

Component B: an organic silicon compound represented by the general formula: $R^1SiX^1_3$ (wherein, $R^1$ represents an organic group having a polymerizable reactive group and having two or more carbon atoms; and $X^1$ represents a hydrolytic group).

Component C: an organic silicon compound represented by the general formula: $R^2{}_nR^3{}_mSiX^2{}_{4-n-m}$ (wherein, $R^2$ represents an organic group having a polymerizable reactive group; $R^3$ represents a hydrocarbon group having 1 to 6 carbon atoms; $X^2$ represents a hydrolytic group; n represents 0 or 1; and m represents 0 or 1).

Component D: silica fine particles having a mean particle diameter of 1 to 150 nm.

Herewith, by forming a primer layer between the plastic lens substrate including at least a sulfur atom, and the hard coat layer formed with a coating composition including the Component A and Component B, the primer layer separates the hard coat layer from the sulfur atom in the plastic lens substrate which may prohibit the interaction between the hard coat layer and the plastic lens substrate. In addition, the presence of the primer layer at the interface of both the plastic lens substrate and the hard coat layer can afford adhesiveness to both the plastic lens substrate and the hard coat layer, and thus, high adhesiveness may be achieved even in tinted lens which was tinted. Consequently, durability of the hard coat layer can be improved.

It is preferable that the primer layer is a coating film formed with a coating composition which includes the following Component E and Component F.

Component E: an organic resin polymer having a polar group.

Component F: metal oxide fine particles including titanium oxide.

Herewith, due to the primer layer being a coating film formed with a coating composition which includes the Component E and Component F, the organic resin polymer having a polar group as the Component E achieves the adhesiveness of both the plastic lens substrate and the hard coat layer, while the metal oxide fine particle including titanium oxide as the Component F perfects the refractive index of the primer layer, and functions in improving the crosslinking density of the primer layer as the filler, thereby capable of attempting the improvement of water resistance, and light resistance. In the organic resin polymer used in the primer resin, the polar group can be either introduced in the main chain skeleton, or introduced as being branched from the main chain skeleton. For example, in the former case, an urethane bond or an ester bond may be exemplified, while in the latter case, a hydroxyl group or an epoxy group may be exemplified. Such a polar group causes an interaction with a thiourethane bond or an episulfide group of the plastic lens substrate surface, and an epoxy group or a silanol group of the hard coat surface, to achieve excellent adhesiveness.

Moreover, it is preferable that the aforementioned Component E is the polyester resin.

Hence, the Component E included in the primer layer being a polyester resin allows the crosslinking density of the primer layer to be further improved owing to the adhesiveness to the plastic lens substrate including a sulfur atom, and to the dispersibility of the metal oxide fine particles as the Component F to be the filler. Accordingly, the water resistance and light resistance can be further improved. Examples of the polyester resin include those described in JP-A-2000-144048. In the polyester resin, the ester bond and a hydroxyl group or an epoxy group attached to the side chain readily cause an interaction with the molecule on the plastic lens substrate surface, thereby achieving high adhesiveness. In contrast, the polyester resin exhibits weakly acidic pH in many cases, and the pH often agrees with the pH that enables stable existence of the metal oxide fine particle to be the filler. Thus, the metal oxide fine particles turn into a homogenously dispersed state in the primer resin without being localized, thereby resulting in improvement of the crosslinking density of the primer layer, which may lead to improvement of the water resistance and light resistance.

Also, it is preferable that the primer layer includes metal oxide fine particles obtained by subjecting the surface of the Component F to a modifying treatment with an organic silicon compound having an epoxy group.

Accordingly, the outermost face of the metal oxide fine particles including the metal oxide fine particles subjected to a modifying treatment with an organic silicon compound having an epoxy group allows the binding force with the polyester resin to be improved, and further improves the crosslinking density of the primer layer, with enabling even more improvement of the water resistance and light resistance. Modification with the organic silicon compound having an epoxy group causes an interaction with the ester bond, hydroxyl group, epoxy group or the like in the polyester resin to improve the stability in the primer skeleton. Moreover, the epoxy group of the metal oxide fine particle surface causes a ring opening polymerization reaction through heat curing, thereby contributing to adhesiveness between the plastic lens substrate and the hard coat surface.

Moreover, it is preferable that the plastic lens substrate includes a thiourethane based resin and/or an episulfide based resin.

Herewith, the thiourethane based resin and/or the episulfide based resin are/is a plastic lens substrate that is excellent in the processibility, safety and the like, and exhibit(s) a high refractive index. Thus, when combined with an antireflection film composed of an organic thin film formed on the upper layer of the plastic lens substrate surface, a plastic lens (optical component) that has a great difference in the refractive index and is excellent in the reflection characteristic can be obtained.

Furthermore, another aspect of the invention is the method of manufacturing a plastic lens of the invention including: obtaining a plastic lens substrate by cast polymerization of a polymerizable composition including a monomer having a sulfur atom in the molecule; forming a primer layer on the plastic lens substrate; forming a hard coat layer on the primer layer using a coating composition including at least the following Component A and Component B: and forming on the hard coat layer an organic antireflective layer having a refractive index that is lower than the refractive index of the hard coat layer by 0.10 or more using a coating composition including at least the following Component C and Component D.

Component A: metal oxide fine particle including titanium oxide having a rutile crystal structure.

Component B: organic silicon compound represented by the general formula: $R^1SiX^1_3$ (wherein, $R^1$ represents an organic group having a polymerizable reactive group and having two or more carbon atoms, $X^1$ represents a hydrolytic group).

Component C: organic silicon compound represented by the general formula: $R^2{}_nR^3{}_mSiX^2{}_{4-n-m}$ (wherein, $R^2$ represents an organic group having a polymerizable reactive group; $R^3$ represents a hydrocarbon group having 1 to 6 carbon atoms; $X^2$ represents a hydrolytic group; n represents 0 or 1; and m represents 0 or 1).

Component D: silica fine particles having a mean particle diameter of 1 to 150 nm.

According to this method of manufacturing, the plastic lens is manufactured by a step of forming a primer layer on a plastic lens substrate obtained by the cast polymerization of a polymerizable composition including a monomer having a sulfur atom in the molecule; a step of forming a hard coat layer on the primer layer using a coating composition including at least the following Component A and Component B: and a step of forming on the hard coat layer an organic antireflective layer having a refractive index that is lower than the refractive index of the hard coat layer by 0.10 or more using a coating composition including at least the aforementioned Component C and Component D. In this process, thus formed primer layer separates the hard coat layer from the sulfur atom in the plastic lens substrate which may prohibit the interaction between the hard coat layer and the plastic lens substrate, and is present at the interface of both the plastic lens substrate and the hard coat layer to simultaneously achieve the adhesiveness to both the plastic lens substrate and the hard coat layer, thereby enabling obtaining a plastic lens having a hard coat layer with improved durability to be obtained.

DESCRIPTION OF EXEMPLARY EMBODIMENTS

Hereinafter, embodiments of the plastic lens and method of manufacturing a plastic lens of the present invention will be explained.

The plastic lens of this embodiment has a plastic lens substrate, a primer layer formed on the plastic lens substrate surface, a hard coat layer formed on the upper face of this primer layer, and an antireflection film formed on this hard coat layer. Hereinafter, the plastic lens substrate, the primer layer, the hard coat layer, and the antireflection film will be explained.

1. Plastic Lens Substrate

Material of the plastic lens substrate (hereinafter, referred to as "lens substrate") is not particularly limited as long as it is a plastic resin, but a lens material having a refractive index of 1.6 or greater is preferably used in order to give the difference in the refractive index from the antireflection film composed of an organic thin film formed on the upper layer of the lens substrate surface. Exemplary lens material having a refractive index of 1.6 or greater may be a polythiourethane based plastic produced by allowing a reaction of a compound having an isocyanate group or an isothiocyanate group and a compound having a mercapto group, an episulfide plastic produced by polymerizing to cure a material monomer including a compound having an episulfide group, or the like.

As the compound having an isocyanate group or an isothiocyanate group to be the principal component of the polythiourethane based plastic, any of known compounds can be used. Specific examples of the compound having an isocyanate group include ethylene diisocyanate, trimethylene diisocyanate, 2,4,4-trimethylhexane diisocyanate, hexamethylene diisocyanate, m-xylylene diisocyanate and the like.

Also, as the compound having a mercapto group, any of known compounds can be used. Examples thereof include e.g., aliphatic polythiol such as 1,2-ethanedithiol, 1,6-hexanedithiol and 1,1-cyclohexanedithiol; aromatic polythiol such as 1,2-dimercapto benzene and 1,2,3-tris(mercaptomethyl)benzene.

Furthermore, for providing the plastic lens having a higher refractive index, polythiol including a sulfur atom is more preferably used in addition to the mercapto group, and specific examples thereof include 1,2-bis(mercaptomethylthio)benzene, 1,2,3-tris(mercaptoethylthio)benzene, 1,2-bis((2-mercaptoethyl)thio)-3-mercaptopropane and the like.

In addition, specific examples of the compound having an episulfide group for use as a material monomer of the episulfide plastic include known compounds having an episulfide group without any limitation. Examples thereof include e.g., episulfide compounds obtained by substituting a part of or all oxygen of the epoxy group of preexisting epoxy compounds with sulfur.

Furthermore, for the purpose of providing a plastic lens having a higher refractive index, a compound including a sulfur atom is more preferably used in addition to the episulfide group. Specific examples include 1,2-bis(β-epithiopropylthio)ethane, bis-(β-epithiopropyl)sulfide, 1,4-bis(β-epithiopropylthiomethyl)benzene, 2,5-bis(β-epithiopropylthiomethyl)-1,4-dithiane, bis-(β-epithiopropyl)disulfide and the like.

Process for polymerization of the lens substrate according to the invention is not particularly limited, but a polymerization method generally used in manufacturing lens substrates may be employed.

For example, when a vinyl monomer is used as the material, thermal curing is carried out using a thermal polymerization initiator such as an organic peroxide thereby producing a lens substrate. Also, using a photopolymerization initiator such as benzophenone, the monomer is cured by irradiating an ultraviolet ray to produce a lens substrate.

Moreover, when a polythiourethane based plastic produced by subjecting a compound having an isocyanate group or an isothiocyanate group to a reaction with a compound having a mercapto group is used, after mixing the compound having an isocyanate group or an isothiocyanate group and a compound having a mercapto group, it can be produced by adding a curing catalyst for an urethane resin thereto followed by mixing to execute heat curing. Specific examples of the curing catalyst include amine compounds such as ethylamine, ethylenediamine, triethylamine and tributylamine, dibutyltin dichloride, dimethyltin dichloride, and the like.

Moreover, when an episulfide plastic obtained by the polymerization of a material monomer including a compound having an episulfide group as the material is used for a lens substrate, after mixing a compound having an episulfide group alone, or together with other monomer that is copolymerizable with an episulfide group, it can be produced by adding a curing catalyst for an epoxy resin thereto followed by mixing to execute polymerization curing by heating.

Although the curing catalyst for an epoxy resin is not particularly limited, but specific examples include tertiary amines such as dimethylbenzylamine, dimethylcyclohexylamine, diethylethanolamine, dibutylethanolamine and tri-dimethylaminomethyl phenol, imidazoles such as ethylmethyl imidazole, and the like.

Furthermore, examples of the other monomer that is copolymerizable with a compound having an episulfide group include compounds having a hydroxyl group, compounds having a mercapto group, primary or secondary amine, compounds having a carboxyl group, and the like.

Specific examples of the compound having a hydroxyl group include alcohols such as isopropyl alcohol and n-hexyl alcohol, polyhydric alcohols such as ethylene glycol, 1,6-hexanediol, pentaerythritol dimethacrylate and pentaerythritol diacrylate specific examples of the compound having a mercapto group include thiophenol, ethylthioglycolate, bis (2-mercaptoethyl)sulfide, 2,5-dimercaptomethyl-1,4-dithiane and the like.

2. Primer Layer the Primer Layer is Formed on the Lens Substrate Surface.

The primer layer is present at the interface of both the lens substrate including a sulfur atom and the hard coat layer described later, and exhibits a property to simultaneously achieve the adhesiveness to both the lens substrate including an inert sulfur atom and the hard coat layer, thereby playing a role to improve the durability of the film subjected to the surface treatment. In addition, it is accompanied by a property as an absorbing layer against the external impact, i.e., has a property to improve the impact resistance. Also, the primer layer is formed using a coating composition containing at least the following Component E and Component F.

Component E: organic resin polymer having a polar group;
Component F: metal oxide fine particle including titanium oxide.

The Component E serves in exhibiting the adhesiveness to both the lens substrate and the hard coat layer. The Component F serves in exhibiting the refractive index of the primer, and acts in improving the crosslinking density of the primer layer as a filler, thereby capable of attempting to improve the water resistance, weather resistance as well as light resistance.

Examples of the Component E which can be used include a variety of resins such as polyester resins, polyurethane resins, epoxy resins, melamine resins, polyolefin resins, urethane acrylate resins and epoxyacrylate resins. Among these, a polyester resin can be preferably used in light of the adhesiveness to the lens substrate including a sulfur atom, and the dispersibility of the metal oxide fine particles to be a filler.

In the polyester resin, the ester bond and the hydroxyl group or epoxy group attached to the side chain in the resin readily causes an interaction with the plastic lens substrate surface molecule, thereby achieving high adhesiveness. In contrast, the polyester resin exhibits weakly acidic pH in many cases, and the pH often agrees with the pH to enable stable existence of the metal oxide fine particle to be the filler. Thus, the metal oxide fine particles turn into a homogenously dispersed state in the primer resin without being localized. Accordingly, the crosslinking density of the primer layer can be stabilized or improved, which may lead to improvement of the water resistance and light resistance.

Illustrative examples of the polyester resin include thermoplastic polyester elastomers described in JP-A-2000-144048. The thermoplastic polyester elastomer is a multiblock copolymer in which polyester is used as the hard segment, while polyether or polyester is used as the soft segment. With respect to the weight ratio of the hard segment (H) and the soft segment (S), H/S=30/70 to 90/10, and preferably 40/60 to 80/20.

The polyester as a hard segment constitutional component substantially includes a dicarboxylic acid and a low molecular glycol. Examples of the dicarboxylic acid include aromatic dicarboxylic acids such as terephthalic acid, isophthalic acid, phthalic acid and 2,6-naphthalene dicarboxylic acid; straight-chain saturated aliphatic dicarboxylic acids having 4 to 20 carbon atoms such as succinic acid, adipic acid, azelaic acid, decamethylene dicarboxylic acid and octadecane dicarboxylic acid, aliphatic oxocarboxylic acids such as ε-oxycaproic acid, dimer acids (dibasic acids prepared by dimerizing an aliphatic monocarboxylic acid having a double bond), and ester-forming derivatives of the same. Among these, terephthalic acid and 2,6-naphthalene dicarboxylic acid are desired in use.

Additionally, examples of the low molecular glycol include aliphatic glycols such as ethylene glycol, trimethylene glycol, 1,4-butanediol, 1,5-pentanediol, 1,6-hexanediol and neopentyl glycol, aliphatic glycols such as 1,6-cyclohexanedimethanol and the like, and the ester-forming derivatives of the same. Among these, ethylene glycol and 1,4-butanediol are desired in use.

The polyester as a soft segment constitutional component includes a dicarboxylic acid and a long-chain glycol. Examples of the dicarboxylic acid include those set forth above. Examples of the long-chain glycol include poly (1,2-butadiene glycol), poly (1,4-butadiene glycol) and the hydrogenated product of the same, and the like. Furthermore, ε-caprolactone (C6), enantholactone (C7) and caprylolactone (C8) are also useful as a polyester component Among these, ε-caprolactone is desired in use.

Examples of the polyether as a soft segment constitutional component include poly(alkyleneoxide)glycols such as poly (ethyleneoxide)glycol, poly(1,2-propyleneoxide)glycol, poly(1,3-propyleneoxide)glycol and poly(tetramethyleneoxide)glycol. Among these, poly(tetramethyleneoxide)glycol is desired in use.

In the method of producing the thermoplastic polyester elastomer, for example, a low polymer is formed by heating a lower alkyl ester of a dicarboxylic acid with an aliphatic long-chain glycol and an excessive low molecular glycol in the presence of a catalyst such as tetrabutyl titanate at a temperature of 150 to 200° C. to allow for an ester exchange reaction. Then, this low polymer is further heated under high vacuum at 220 to 280° C. with stirring, thereby executing polycondensation to give a thermoplastic polyester elastomer. The low polymer can be also obtained by a direct esterification reaction of a dicarboxylic acid with a long-chain glycol and low molecular glycol.

The thermoplastic polyester elastomer can be used as a mixture with other polymer, which may be, for example, arbitrarily a usual ester based resin (PBT, PET or the like), amide based resin, as well as a thermoplastic amide elastomer or the like. In general, it may account for less than 50%, desirably less than 30% as a ratio in the total polymer.

Furthermore, the thermoplastic polyester elastomer can be prepared as a primer composition of the solution type. However, in light of the processibility and environmental protection, it is desirably used as a primer composition of a water-based emulsion. Although preparation of this water-based emulsion may be carried out according to any conventionally used process, specifically, a forced emulsification process is desired in which the polymer is subjected to high mechanical shearing in the presence of a surfactant (external emulsifying agent) to permit forced emulsification.

On the other hand, the Component F which may be used is metal oxide fine particles including titanium oxide, which has a mean particle diameter of 1 to 200 nm, and preferably 5 to 30 nm. Furthermore, the metal oxide fine particle may include titanium oxide alone, or may include titanium oxide and other inorganic oxide. For example, an oxide of a metal such as Si, Al, Sn, Sb, Ta, Ce, La, Fe, Zn, W, Zr or In, and titanium oxide may be used in a mixture as the other inorganic oxide. Moreover, the metal oxide fine particle being Component F may be a composite particle of titanium oxide and other inorganic oxide. When the composite particle with the other inorganic oxide is used, for example, one yielded by compounding an oxide of a metal such as Si, Al, Sn, Sb, Ta, Ce, La, Fe, Zn, W, Zr or In, and titanium oxide may be used.

Furthermore, the Component F is preferably used as a dispersant in a dispersion medium, for example, water, alcohol, or other organic solvent. In this instance, for the purpose of elevating the disperse stability of the metal oxide fine particles, the surface of the inorganic oxide particle may be treated with an organic silicon compound or an amine compound.

Illustrative examples of the organic silicon compound which may be used in this treatment include monofunctional silane, bifunctional silane, trifunctional silane, tetrafunctional silane and the like.

Illustrative examples of the amine compound include ammonium, alkylamine such as ethylamine, triethylamine, isopropylamine and n-propylamine, aralkylamine such as benzylamine, alicyclic amine such as piperidine, alkanolamine such as monoethanolamine and triethanolamine. Among these, metal oxide fine particles the outermost face of which being subjected to a modifying treatment with an organic silicon compound having an epoxy group are preferably used for the purpose of improving the binding force with the polyester resin to further improve the crosslinking density of the primer film, and improving the water resistance, weather resistance and light resistance. Amount of addition of the organic silicon compound or amine compound preferably falls within the range of approximately 1 to 15% of the weight of the inorganic oxide particle.

Moreover, the metal oxide fine particle including titanium oxide as the Component F preferably includes composite oxide core particles having a rutile crystal structure. However, when the metal oxide fine particle including titanium oxide having a rutile crystal structure is used in the hard coat layer described later, because the hard coat layer has an ultraviolet ray absorption capacity, conventional composite oxide fine particles including titanium oxide having an anatase crystal structure can be also used in the primer layer.

Also, tin oxide can be used as the inorganic oxide fine particle other than titanium oxide. For example, inorganic oxide fine particles are preferably used that were prepared using composite fine particles of: tin oxide or tin oxide particle and zirconium dioxide particle; or tin oxide particle and zirconium dioxide particle and silicon dioxide particle as the core, by covering the surface with composite colloid particles composed of one or two or more of silicon dioxide, zirconium dioxide, antimony pentoxide, aluminum oxide and the like. Tin oxide has lower refractive index in comparison with titanium oxide, therefore, it is necessary to increase the using amount for giving a primer layer having a high refractive index. However, it is believed to have less photoactive action as titanium oxide, therefore, preferable combination would be provided in case in which durability of the primer layer and the hard coat layer themselves is desired.

However, in view of the light resistance and refractive index, it is more preferred that composite oxide fine particles including titanium oxide having a rutile crystal structure are used also in the primer layer. The composite oxide fine particles including titanium oxide having a rutile crystal structure are excellent in the light resistance, and have a higher refractive index compared to the anatase type. Therefore, using amount in the primer film can be reduced, thereby enabling the amount of the resin component that is responsible for the adhesiveness to be increased.

Thus resulting coating composition for forming a primer layer can be used after diluting in a solvent as needed. Examples of the solvent which may be used include alcohols, esters, ketones, ethers, aromatic series and the like.

To the coating composition may be added a small amount of a metal chelating compound, a surfactant, an antistatic agent, an ultraviolet ray absorbing agent, an antioxidant, a disperse dye, an oil soluble dye, a pigment, a photochromic compound, a light and a heat resistant heat stabilizer such as hindered amine or hindered phenol, or the like as needed in addition to the aforementioned components, thereby also enabling improvement of the application performance, curing speed and film formation performance after curing of the coating liquid.

Furthermore, in applying the composition for coating (coating liquid), aiming at improving the adhesiveness between the lens substrate and the primer film, an alkali treatment, an acid treatment, a surfactant treatment, a flaking/grinding treatment with inorganic or organic fine particles or a plasma treatment of the lens substrate surface will be effectively carried out beforehand.

Moreover, in the method of application/curing of the composition for coating, after applying the composition for coating by a dipping process, spin coat process, spray coat process, roll coat process, flow coat process or the like, the primer layer can be formed by heating/drying at a temperature of 40 to 200° C. for several hours.

It is preferred that the primer layer has a film thickness falling within the range of 0.01 to 50 μm, and particularly 0.1 to 30 μm. When the primer layer is too thin, essential performances such as water resistance and impact resistance can not be achieved, and when it is too thick to the contrary, smoothness of the surface may be deteriorated, and optical distortion as well as defective appearance such as white turbidity and loss of transparency may be caused.

3. Hard Coat Layer

The hard coat layer is formed on a primer layer which had been formed on the lens substrate surface. The hard coat layer includes at least the following Component A and Component B: Component A: metal oxide particles including titanium oxide having a rutile crystal structure, and Component B: an organic silicon compound represented by the general formula: $R^1SiX^1_3$ (wherein, $R^1$ represents an organic group having a polymerizable reactive group and having two or more carbon atoms, and $X^1$ represents a hydrolytic group).

More specifically, it is a coating film formed with a composition for coating which includes at least the following Component A and Component B.

Examples of the Component A include e.g., inorganic oxide fine particles having a mean particle diameter of 1 to 200 nm and including a composite oxide which has a rutile crystal structure and includes titanium oxide and tin oxide, or titanium oxide, tin oxide and silicon dioxide; while examples of the Component B include organic silicon compounds represented by the general formula: $R^1SiX^1_3$ (wherein, $R^1$ represents an organic group having a polymerizable reactive group and having two or more carbon atoms; and $X^1$ represents a hydrolytic group).

For the hard coat layer, in order to suppress the interference fringe, a high refractive index is desired that is comparable to the plastic lens substrate having a high refractive index. For making the hard coat layer have a higher refractive index, a process in which inorganic oxide fine particles having a high refractive index are used may be generally performed, and specifically, one or two or more oxide of a metal selected from Al, Sn, Sb, Ta, Ce, La, Fe, Zn, W, Zr, In and Ti (including mixtures thereof), and/or transparent and colorless inorganic oxide fine particles composed of a composite oxide including two or more metals may be used. Among these, in terms of the refractive index, transparency, disperse stability and the like, inorganic oxide fine particles including titanium oxide may be generally used.

However, the following problem could be raised when inorganic oxide fine particles including titanium oxide were used as a metal oxide for the hard coat layer. Titanium oxide has a characteristic of decomposing an organic matter by a potent oxidative decomposing force through acquiring an activity upon receiving a light (ultraviolet ray) energy (hereinafter, referred to as photoactivity). As a consequence, when titanium oxide is included as a constitutional component of the hard coat film, an organic matter such as a silane coupling agent that is another principal constitutional component is decomposed by the photoactivity, thereby leading to occurrence of crack or film stripping of the hard coat film. Hence, durability performance tends to be deteriorated.

To the contrary, use of a metal oxide including titanium oxide having a rutile crystal structure is preferred. More specifically, use of metal oxide fine particles including titanium oxide having a rutile crystal structure enables improvement of various disadvantages resulting from the photoactivity of titanium oxide. Because weather resistance and light resistance are further improved by changing the crystal structure of a metal oxide including titanium oxide into the rutile type in place of the anatase type, and the rutile type crystal has a higher refractive index than the anatase type crystal, inorganic oxide fine particles having a comparatively high refractive index can be obtained.

Unlike anatase type titanium oxide having a characteristic of decomposing an organic matter by a potent oxidative decomposing force through acquiring an activity upon receiving a light (ultraviolet ray) energy, titanium oxide having a rutile crystal structure has such a photoactivity being low. Upon irradiation of a light (ultraviolet ray), the electron in the valence band of titanium oxide is excited to form a OH free radical and a $HO_2$ free radical, and thus resulting potent oxidizing force decomposes an organic matter. The aforementioned low photoactivity results from the rutile type titanium oxide being more stable in terms of the thermal energy, thereby yielding a lower amount of production of the free radical than the anatase type titanium oxide. Hence, the hard coat layer in which titanium oxide having a rutile crystal structure was incorporated is excellent in the weather resistance and light resistance, therefore, there is no possibility of deterioration of the antireflection film due to the hard coat layer composed of an organic thin film. Accordingly, a plastic lens that is excellent in the weather resistance and light resistance can be obtained.

Although several procedures for obtaining titanium oxide having a rutile crystal structure are suggested, it is preferred to provide a composite oxide with tin oxide, and further, the composite oxide to which silicon dioxide was added. When the composite oxide with tin oxide is added, regarding the amount of the titanium oxide and tin oxide included in the inorganic oxide fine particle, it is desired that weight ratio of $TiO_2/SnO_2$ falls within the range of 1/3 to 20/1 and preferably 1.5/1 to 13/1, with titanium oxide being converted on the basis of $TiO_2$, while tin oxide being converted on the basis of $SnO_2$.

As the amount of $SnO_2$ is decreased below the aforementioned range of the weight ratio, the crystal structure shifts from the rutile type to the anatase type to yield a mixed crystal containing the rutile type crystal and the anatase type crystal, or yield the anatase type crystal. Furthermore, as the amount of $SnO_2$ is increased beyond the aforementioned range of the weight ratio, a rutile crystal structure that is in the intermediate of rutile type crystal of titanium oxide and rutile type crystal of tin oxide is formed, which exhibits a crystal structure distinct from so called rutile type crystal of titanium oxide. In addition, the refractive index of the resulting inorganic oxide fine particle may be also lowered.

Furthermore, when the composite oxide with tin oxide is added to which further added a composite oxide with silicon dioxide added thereto, regarding the amount of the titanium oxide, tin oxide, and silicon dioxide included in the inorganic oxide fine particle, it is desired that weight ratio of $TiO_2/SnO_2$ falls within the range of 1/3 to 20/1 and preferably 1.5/1 to 13/1, and weight ratio of $(TiO_2+SnO_2)/SiO_2$ falls within the range of 50/45 to 99/1 and preferably 70/30 to 98/2, with titanium oxide being converted on the basis of $TiO_2$; tin oxide being converted on the basis of $SnO_2$; and silicon dioxide being converted on the basis of $SiO_2$.

With respect to the content of $SnO_2$, it may be similar to the case in which the composite oxide with tin oxide was included. Additionally, by further including silicon dioxide thereto, stability and dispersibility of the resulting inorganic oxide fine particle can be improved. In this instance, as the amount of $SiO_2$ is decreased below the aforementioned range of the weight ratio, stability and dispersibility may be deteriorated. Also, increase of $SiO_2$ beyond the aforementioned range of the weight ratio is not preferred since the refractive index of the resulting inorganic oxide fine particle may be lowered although the stability and dispersibility may be further improved. However, free radical can be produced also with this rutile type titanium oxide. The same is true in case in which inorganic oxide fine particles including two or more kinds of the composite oxide including titanium oxide are used as the inorganic oxide fine particle including titanium oxide.

Hence, the hard coat layer in the plastic lens of the invention is preferably a coating film formed with a composition for coating which includes the following Component A and Component B.

The Component A is metal oxide fine particles having a mean particle diameter of 1 to 200 nm including core particles of a composite oxide having a rutile crystal structure including titanium oxide and tin oxide, or titanium oxide, tin oxide and silicon dioxide, the surface of which being covered by a covering layer of the composite oxide including silicon dioxide, and zirconium dioxide and/or aluminum oxide. The Component B is an organic silicon compound represented by the general formula: $R^1SiX^1_3$, wherein, $R^1$ represents an organic group having a polymerizable reactive group and having two or more carbon atoms; and $X^1$ represents a hydrolytic group.

As described previously, upon irradiation of a light (ultraviolet ray) on titanium oxide, the electron in the valence band of titanium oxide is excited to form a OH free radical and a $HO_2$ free radical, and the potent oxidizing force thereof decomposes an organic matter. Since the rutile type titanium oxide is more stable in terms of thermal energy than the anatase type titanium oxide, lower amount of production of the free radical is yielded. However, free radical is produced also with this rutile type titanium oxide. Therefore, it is desired that one in which the surface of the core particle including a composite oxide are covered by a covering layer of the composite oxide including silicon dioxide, and zirconium dioxide and/or aluminum oxide is used, because the free radical produced in the core particle is unstable although it has similarly potent oxidizing force, and thus disappears while passing in the covering layer due to the catalytic action of the covering layer.

Although content of titanium oxide and tin oxide, or titanium oxide, tin oxide and silicon dioxide included in the aforementioned core particle is similar to the case described above, the content of silicon dioxide, and zirconium dioxide and aluminum oxide included in the covering layer may be preferably selected from the following range (a) to (c) depending on the combination of the employed composite oxide.

(a) When the covering layer is formed with a composite oxide of silicon dioxide and zirconium dioxide, regarding the amount of the silicon dioxide and zirconium dioxide included in the covering layer, it is desired that weight ratio of $SiO_2/ZrO_2$ falls within the range of 50/50 to 99/1 and preferably 65/35 to 90/10, with silicon dioxide being converted on the basis of $SiO_2$; and zirconium oxide being converted on the basis of $ZrO_2$.

When the amount of $ZrO_2$ is greater than the aforementioned range of the weight ratio, Zr atom which can trap the free radical is increased, but compact covering layer cannot be formed because of occurrence of distortion of the covering layer. Therefore, the free radical generated in/on the core particle appears on the surface of the inorganic oxide fine particle, thereby leading to oxidation of the organic matter. In contrast, when the amount of $ZrO_2$ is less than the aforementioned range of the weight ratio, easy formation of the compact covering layer may be permitted, but the free radical produced in/on the core particle appears on the surface of the inorganic oxide fine particle because of low amount of the Zr atom for trapping the free radical, thereby leading to oxidation of the organic matter.

(b) When the covering layer is formed with a composite oxide of silicon dioxide and aluminum oxide, regarding the amount of the silicon dioxide and aluminum oxide included in the covering layer, it is desired that weight ratio of $SiO_2/Al_2O_3$ falls within the range of 60/40 to 99/1 and preferably 68/32 to 95/5, with silicon dioxide being converted on the basis of $SiO_2$; and aluminum oxide being converted on the basis of $Al_2O_3$.

In this instance, when the amount of $Al_2O_3$ is greater than the aforementioned range, Al atom which can trap the free radical is increased, but compact covering layer cannot be formed. Therefore, the free radical generated in/on the core particle appears on the surface of the inorganic oxide fine particle, thereby leading to oxidation of the organic matter. In contrast, when the amount of $Al_2O_3$ is less than the aforementioned range, easy formation of the compact covering layer may be permitted, but the free radical produced in/on the core particle appears on the surface of the inorganic oxide fine particle because of low amount of the Al atom for trapping the free radical, thereby leading to oxidation of the organic matter.

(c) When the covering layer is formed with a composite oxide of silicon dioxide, and zirconium dioxide and aluminum oxide, regarding the amount of the silicon dioxide, and zirconium dioxide and aluminum oxide included in the covering layer, it is desired that weight ratio of $SiO_2/(ZrO_2+Al_2O_3)$ falls within the range of 98/2 to 6/4 and preferably 95/5 to 7/3, with silicon dioxide being converted on the basis of $SiO_2$; zirconium oxide being converted on the basis of $ZrO_2$; and aluminum oxide being converted on the basis of $Al_2O_3$.

When total amount of $ZrO_2$ and $Al_2O_3$ is greater than the aforementioned range of the weight ratio, total amount of Zr atom and Al atom which can trap the free radical is increased, but compact covering layer cannot be formed. Therefore, the free radical generated in/on the core particle appears on the surface of the inorganic oxide fine particle, thereby leading to oxidation of the organic matter. In contrast, when the total amount of $ZrO_2$ and $Al_2O_3$ is less than the aforementioned range of the weight ratio, easy formation of the compact covering layer may be permitted, but the free radical produced in/on the core particle appears on the surface of the inorganic oxide fine particle because of low total amount of the Zr atom and Al atom for trapping the free radical, thereby leading to oxidation of the organic matter. Furthermore, it is desired that the covering layer has a thickness falling within the range of 0.02 to 2.27 nm and preferably 0.16 to 1.14 nm, in light of preventing the free radical generated in/on the core particle from appearing on the surface of the inorganic oxide fine particle, which may lead to oxidation of the organic matter.

The composite oxide referred to herein which constitutes the core particle means a composite solid solution oxide including titanium oxide and tin oxide (including doped composite oxide) and/or a composite oxide cluster, or a composite solid solution oxide including titanium oxide, tin oxide and silicon dioxide (including doped composite oxide) and/or a composite oxide cluster. Moreover, the composite oxide constituting the core particle and/or the covering layer may be a composite hydrated oxide having a OH group at the end, or may be one further including a composite hydrated oxide in part.

It is desired that the inorganic oxide fine particles including titanium oxide have a mean particle size falling within the range of 1 to 200 nm, and preferably 5 to 30 nm in diameter. When the mean particle size is less than 1 nm, bridge formation between the particles may be caused in drying step for forming the hard coat layer on the plastic lens substrate, thus disabling the homogeneous contraction and leading to decline of the contraction percentage. Accordingly, a hard coat layer having a sufficient film hardness cannot be obtained. In contrast, when the mean particle size is beyond 200 nm, the hard coat layer is whitened, and becomes inadequate for use in optical components.

Additionally, the inorganic oxide fine particle including titanium oxide having a rutile crystal structure may be used alone, or in combination with other inorganic oxide particle. Illustrative examples of the other inorganic oxide particle include oxides of one or two or more metals selected from Si, Al, Sn, Sb, Ta, Ce, La, Fe, Zn, W, Zr and In (including mixtures thereof), and/or inorganic oxide fine particles including a composite oxide containing two or more of the metals.

Specific examples of the inorganic oxide fine particle include dispersion media prepared by dispersing inorganic oxide fine particles including titanium oxide having a rutile crystal structure having a mean particle diameter of 1 to 200 nm in for example, water, an alcohol or other organic solvent to give a colloidal form. Examples of commercially available dispersion medium include disperse sol for coating (manufactured by Catalysts & Chemicals Industries Co., Ltd., Optlake) which includes inorganic oxide fine particles having a mean particle diameter of 8 to 10 nm prepared by covering the surface of core particles of a composite oxide having a rutile crystal structure including titanium oxide and tin oxide, or titanium oxide, tin oxide and silicon dioxide, with a covering layer of a composite oxide including silicon dioxide, and zirconium dioxide and/or aluminum oxide, and the like.

In order for further improving the disperse stability in the composition for coating, these inorganic oxide fine particles the surface of which being subjected to a treatment with an organic silicon compound or an amine compound, and further with a carboxylic acid such as tartaric acid and malic acid can be also used.

Examples of the organic silicon compound which may be used in this step include monofunctional silane, bifunctional silane, trifunctional silane, tetrafunctional silane and the like. Also, in the treatment, the hydrolytic group may remain unprocessed, or may be previously hydrolyzed. Furthermore, although the hydrolytic group is preferably in the state of being reacted with the —OH group of the fine particles after the hydrolytic treatment, any problem involving stability may be raised even in the state in which the —OH group in part remain unreacted.

Further, examples of the amine compound include ammonium or alkylamine such as ethylamine, triethylamine, isopropylamine or n-propylamine, aralkylamine such as benzylamine, alicyclic amine such as piperidine, alkanolamine such as monoethanolamine or triethanolamine.

Type and amount of the incorporated inorganic oxide fine particle may be determined depending on the intended hardness, refractive index and the like, however, the amount desirably falls within the range of 5 to 80% by weight, and particularly 10 to 50% by weight of the solid content in the hard coat composition. When the amount is too small, abrasion resistance of the coating film may be insufficient. In contrast, when the amount is too large, crack may be generated on the coating film, and the tinting property may be also insufficient.

Next, the Component B (organic silicon compound represented by the general formula: $R^1SiX^1{}_3$) will be explained.

The Component B serves as a binder agent of the hard coat layer. In the general formula of the Component B, $R^1$ represents an organic group having a polymerizable reactive group, and having 2 or more carbon atom. $R^1$ has a polymerizable reactive group such as a vinyl group, an allyl group, an acryl group, a methacryl group, a 1-methylvinyl group, an epoxy group, a mercapto group, a cyano group, an isocyano group or an amino group. Moreover, $X^1$ represents a hydrolyzable functional group, and examples thereof include e.g., alkoxy groups such as methoxy group, ethoxy group and methoxyethoxy group, halogen groups such as chloro group and bromo group, acyloxy group, and the like.

Examples of the organic silicon compound of the Component B include e.g., vinyltrialkoxysilane, vinyltrichlorosilane, vinyltri(β-methoxy-ethoxy)silane, allyltrialkoxysilane, acryloxypropyltrialkoxysilane, methacryloxypropyltrialkoxysilane, γ-glycidoxypropyltrialkoxysilane, β-(3,4-epoxycyclohexyl)-ethyltrialkoxysilane, mercaptopropyltrialkoxysilane, γ-aminopropyltrialkoxysilane and the like.

The organic silicon compound of this Component B may be used as a mixture of two or more thereof.

When the Component A is mixed with the Component B to produce a hard coat liquid for forming the hard coat layer, it is preferred that a sol including the Component A dispersed therein and the Component B are mixed.

The amount of the included Component A may be determined depending on the hardness, refractive index and the like of the hard coat layer, but is preferably 5 to 80% by weight, and particularly 10 to 50% by weight of the solid content in the hard coat liquid. When the amount is too small, abrasion resistance of the hard coat layer may be insufficient, while when the amount is too large, crack may be generated on the hard coat layer. Also, when the hard coat layer is tinted, the tinting property is deteriorated as the case may be.

Moreover, the hard coat layer becomes very advantageous by including not only the Component A and the Component B, but also a polyfunctional epoxy compound. The polyfunctional epoxy compound improves the adhesiveness of the hard coat layer to the primer layer, and also improves the water resistance of the hard coat layer and the impact resistance as a plastic lens. Furthermore, when a hydroxyl group is present in the molecule of the polyfunctional epoxy compound, adhesiveness to the primer layer is found to be improved. Therefore, use of the polyfunctional epoxy compound including one or more hydroxyl group in one molecule enables the amount of this polyfunctional epoxy compound to be reduced, thereby capable of improving the scuff resistance. In particular, when the antireflection film described later is formed with an organic film on the upper face of the hard coat layer, film thickness of the antireflection film often becomes extremely small. Particularly, when silica particles having voids therein are used in the antireflection film, the hard coat layer is required to have water resistance because water passes therethrough. Therefore, the polyfunctional epoxy compound is extremely advantageous.

Examples of the polyfunctional epoxy compound include e.g., aliphatic epoxy compounds such as 1,6-hexanediol diglycidyl ether, ethylene glycol diglycidyl ether, diethylene glycol diglycidyl ether, triethylene glycol diglycidyl ether, tetraethylene glycol diglycidyl ether, nonaethylene glycol diglycidyl ether, propylene glycol diglycidyl ether, dipropylene glycol diglycidyl ether, tripropylene glycol diglycidyl ether, tetrapropylene glycol diglycidyl ether, nonapropylene glycol diglycidyl ether, neopentylglycol diglycidyl ether, diglycidyl ether of a neopentylglycol hydroxypivalate ester, trimethylolpropane diglycidyl ether, trimethylolpropane triglycidyl ether, glycerol diglycidyl ether, glycerol triglycidyl ether, diglycerol diglycidyl ether, diglycerol triglycidyl ether, diglycerol tetraglycidyl ether, pentaerythritol diglycidyl ether, pentaerythritol triglycidyl ether, pentaerythritol tetraglycidyl ether, dipentaerythritol tetraglycidyl ether, sorbitol tetraglycidyl ether, diglycidyl ether of tris(2-hydroxyethyl)isocyanate, and triglycidyl ether of tris(2-hydroxyethyl)isocyanate, alicyclic epoxy compounds such as isophoronediol diglycidyl ether and bis-2,2-hydroxycyclohexylpropane diglycidyl ether, aromatic epoxy compounds such as resorcin diglycidyl ether, bisphenol A diglycidyl ether, bisphenol F diglycidyl ether, bisphenol S diglycidyl ether, orthophthalate diglycidyl ether, phenol novolak polyglycidyl ether and cresol novolak polyglycidyl ether, and the like.

Among these, an aliphatic epoxy compound such as 1,6-hexanediol diglycidyl ether, diethylene glycol diglycidyl ether, triethylene glycol diglycidyl ether, trimethylolpropane triglycidyl ether, glycerol diglycidyl ether, glycerol triglycidyl ether or triglycidyl ether of tris(2-hydroxyethyl)isocyanate can be preferably used.

Furthermore, a curing catalyst may be added to the hard coat layer. Examples of the curing catalyst include e.g., perchloric acids such as perchloric acid, ammonium perchlorate and magnesium perchlorate, acetylacetonate having Cu(II), Zn (II), Co(II), Ni(II), Be(II), Ce(III), Ta(III), Ti(III), Mn(III), La(III), Cr(III), V(III), Co(III), Fe(III), Al(III), Ce(IV), Zr(IV), V (IV) or the like as a central metal atom, amine, amino acid such as glycine, Lewis acid, organic acid metal salts and the like.

Among these, examples of preferable curing catalyst include magnesium perchlorate, acetylacetonate having Al (III) or Fe (III) as a central metal atom. In particular, acetylacetonate having Fe (III) as a central metal atom is most preferably used.

It is desired that the amount of the added curing catalyst falls within the range of 0.01 to 5.0% by weight of the solid content concentration in the hard coat liquid.

The composition for coating obtained in this manner for forming a hard coat layer may be used after diluting in a solvent as needed. Examples of the solvent which may be used include solvents such as alcohols, esters, ketones, ethers and aromatic series. Also, to the composition for coating used in forming the hard coat layer may be added a small amount of a metal chelating compound, a surfactant, an antistatic agent, an ultraviolet ray absorbing agent, an antioxidant, a disperse dye, an oil soluble dye, a pigment, a photochromic compound, a light and a heat resistant stabilizer such as hindered amine or hindered phenol, or the like as needed, thereby also enabling improvement of the application performance, curing speed and film formation performance after the curing of the coating liquid.

Moreover, in the method of application and curing of the composition for coating, after applying the composition for coating by a dipping process, spin coat process, spray coat process, roll coat process or flow coat process, the hard coat film may be formed by drying through heating at a temperature of 40 to 200° C. for several hours.

It is preferred that the hard coat layer has a film thickness of 0.05 to 30 μm. When the film thickness is less than 0.05 μm, key performance can not be accomplished. Also, when the film thickness is beyond 30 μm, smoothness of the surface may be deteriorated, or optical distortion may be caused.

4. Antireflection Film

The antireflection film is formed on the hard coat layer.

The formed antireflection film is an organic thin film having a refractive index that is lower than the refractive index of the hard coat layer by 0.10 or more, and having a film thickness of 50 nm to 150 nm.

The organic thin film for forming the antireflection film is not limited as long as it has a refractive index that is lower than the refractive index of the hard coat layer by 0.10 or more and has a film thickness of 50 nm to 150 nm, but an organic thin film formed using a silicone, acrylic, epoxy, urethane or melamine resin, or the material monomer thereof alone, or an organic thin film formed using two or more of these resins or material monomers thereof and other resin or the material monomer thereof in combination can be preferably used. Among these, in view of various characteristics as a plastic lens such as heat resistance, chemical resistance and scuff resistance in particular, a layer including a silicone based resin and having a low refractive index may be preferably provided, and in this instance, it is more preferred that an inorganic matter having a fine particulate form is added for the purpose of improving the surface hardness and for adjusting the refractive index. Examples of the inorganic matter having a fine particulate form which may be added include sols accompanied by colloidal dispersion and the like, and specific examples include silica sols, magnesium fluoride sols, calcium fluoride sols and the like.

Furthermore, as the antireflection film, an organic thin film formed with a wet process using a composition for coating including the Component C, and Component D described below may be preferably used. The Component C is an organic silicon compound represented by the general formula: $R^2{}_n R^3{}_m SiX^1{}_{4-n-m}$ (wherein, $R^2$ represents an organic group having a polymerizable reactive group; $R^3$ represents a hydrocarbon group having 1 to 6 carbon atoms; $X^2$ represents a hydrolytic group; n represents 0 or 1; and m represents 0 or 1), while the Component D is silica fine particles having a mean particle diameter of 1 to 150 nm.

In the Component C (an organic silicon compound represented by the general formula: $R^2{}_n R^3{}_m SiX^2{}_{4-n-m}$), examples of the organic group having a polymerizable reactive group represented by $R^2$ in the general formula include e.g., vinyl group, allyl group, acryl group, methacryl group, epoxy group, mercapto group, cyano group, amino group and the like. Also, specific examples of the hydrocarbon group having 1 to 6 carbon atoms represented by $R^3$ include methyl group, ethyl group, butyl group, vinyl group, phenyl group, perfluoroalkyl group and the like. Furthermore, specific examples of the hydrolyzable functional group (hydrolytic group) represented by $X^2$ include alkoxy groups such as methoxy group, ethoxy group and methoxyethoxy group, halogen groups such as chloro group and bromo group, acyloxy group, and the like.

Specific examples of the organic silicon compound represented by such general formula include vinyltrialkoxysilane, vinyltrichlorosilane, vinyltri(β-methoxy-ethoxy)silane, allyltrialkoxysilane, acryloxypropyltrialkoxysilane, methacryloxypropyltrialkoxysilane, methacryloxypropyldialkoxymethylsilane, γ-glycidoxypropyltrialkoxysilane, β-(3,4-epoxycyclohexyl)-ethyltrialkoxysilane, mercaptopropyltrialkoxysilane, γ-aminopropyltrialkoxysilane, N-β(aminoethyl)-γ-aminopropylmethyldialkoxysilane, tetraalkoxysilane and the like.

Furthermore, examples of the silica fine particle of the Component D include silica sols prepared by dispersing silica fine particles having a mean particle diameter of 1 to 150 nm in, for example, a dispersion medium such as water, alcohol or other organic solvent to give a colloidal form. Also, for attaining a low refractive index, for example, a silica sol is preferably used which includes silica fine particles having voids or pores formed inside thereof. By incorporating a gas or solvent having a refractive index lower than silica into the voids inside of the silica fine particles, the refractive index is further reduced in comparison with the silica fine particles without void, thereby attaining a low refractive index of the antireflection film.

The silica fine particle having voids inside thereof can be produced by a method described in JP-A-2001-233611 and the like, however, according to the invention, those having a mean particle diameter falling within the range of 20 to 150 nm, and having a refractive index falling within the range of 1.16 to 1.39 are preferably used. When the particles have a mean particle diameter of less than 20 nm, porosity inside of the particles may be so small that a desired low refractive index may not be attained. Moreover, the mean particle diameter beyond 150 nm is not preferred because the haze of the organic thin film may be increased.

Examples of the silica fine particle having internal voids include a disperse sol including hollow silica fine particles having a mean particle diameter of 20 to 150 nm, and a refractive index of 1.16 to 1.39, and the like.

Moreover, to the composition for coating used in forming the antireflection film may be added any of various resins such as polyurethane based resins, epoxy based resins, melamine based resins, polyolefin based resins, urethane acrylate resins and epoxyacrylate resins, as well as any of various monomers such as methacrylate, acrylate, epoxy and vinyl monomers, which may be a resin material of the same. Further, for the purpose of reducing the refractive index, it is preferred that any of various polymers including fluorine, or any of various monomers including fluorine is added thereto.

As the polymer including fluorine, a polymer obtained by the polymerization of a vinyl monomer including fluorine is preferred. More preferably, the polymer may have a functional group that is copolymerizable with other component.

Such a composition for coating used in a layer having a low refractive index can be used after diluting in a solvent as needed. Examples of the solvent which may be used include water, alcohols, esters, ketones, ethers, aromatic series and the like.

Moreover, to the coating composition for a film having a low refractive index which forms the antireflection film and includes the Component C and Component D may be added a small amount of a curing catalyst, a surfactant, an antistatic agent, an ultraviolet ray absorbing agent, an antioxidant, a light stabilizer such as hindered amine or hindered phenol, a disperse dye, an oil soluble dye, a fluorescence dye, a pigment, or the like as needed, thereby capable of improving the application performance of the coating liquid, and improving the film formation performance following the curing.

Then, as the antireflection film, a coating composition film having a low refractive index is formed on the hard coat layer with a wet process.

Inorganic films formed with a dry process such as a vapor deposition process or sputtering process exhibit inferior heat resistance due to great difference in coefficient of thermal expansion from the hard coat layer composed of an organic film that is an underlayer. In contrast, antireflection films composed of an organic thin film formed with a wet process are excellent in the heat resistance because the crack by heat is hardly caused due to small difference in coefficient of thermal expansion from the coat layer. Moreover, because it can be formed with a wet process, a vacuum unit or a large-scale equipment may be unnecessary, and simple production is enabled.

As the method for forming an antireflection film having a low refractive index by a wet process, any known process such as a dipping process, a spinner process, a spray process or a flow process can be used. Among these processes for film formation, a dipping process or a spinner process is preferred in light of film formability of a thin film having a film thickness of 50 nm to 150 nm without unevenness to give a curved face shape such as a plastic lens. Upon formation of the antireflection film having a low refractive index on the hard coat layer, it is preferred that the hard coat layer surface be subjected to a pretreatment. Specific examples of effective pretreatment include surface grinding, ultraviolet ray-ozone washing, plasma treatment and the like in which the hard coat layer surface is hydrophilized (contact angle θ=60° or less).

Specific method for forming the antireflection film may be carried out according to the procedure described below.

First, the organic silicon compound of the Component C is diluted in an organic solvent, and hydrolysis is carried out through adding thereto water or dilute hydrochloric acid, acetic acid or the like as needed. Furthermore, a preparation of the silica fine particles of the Component D dispersed in an organic solvent at a percentage of 5 to 50% by weight to give a colloidal form is added thereto. Thereafter, a surfactant, an ultraviolet ray absorbing agent, an antioxidant or the like is added as needed, followed by stirring enough. Thereafter, the mixture is used as a coating liquid.

In this step, the concentration in the diluted coating liquid per the solid content following curing may be preferably 0.5 to 15% by weight in terms of the solid content-concentration, and more preferably 1 to 10% by weight. When the solid content concentration is beyond 15% by weight, to give a predetermined film thickness may be difficult even though the drawing speed is reduced in the dipping process, or the rotational frequency is elevated in the spinner process, and thus, the film thickness may be excessively great. In contrast, when the solid content concentration is lower than 0.5% by weight, to give a predetermined film thickness may be difficult even though the drawing speed is accelerated in the dipping process, or the rotational frequency is lessened in the spinner process, and thus, the film thickness may be excessively small. Moreover, when the speed is too great, or the rotational frequency is too small, unevenness of application on the lens is liable to be so great that it can not be dealt with even though a surfactant or the like is added.

After applying the coating liquid on the plastic lens, curing is permitted by heat or ultraviolet ray to allow an antireflection film to be obtained, in which the curing is preferably permitted by a heat treatment. Heating temperature in the heat treatment may be determined taking into consideration of the constitution of the composition for coating, heat resistance of the lens substrate and the like, however, it is preferably 50° C. to 200° C., and more preferably 80° C. to 140° C.

Thus resulting antireflection film is required to have a film thickness falling within the range of 50 nm to 150 nm. Satisfactory antireflective effect cannot be achieved when the thickness is either too much greater or to much less than this range. Moreover, for allowing the function as an antireflection film, it is necessary that the antireflection film has a refractive index accompanied by the difference from the refractive index of the hard coat layer, which is an under layer, of 0.10 or more, preferably 0.15 or more, and more preferably 0.20 or more. Specifically, it is preferred that the refractive index fall within the range of 1.30 to 1.45.

On the plastic lens produced by forming a primer layer, a hard coat layer and an antireflection film on a lens substrate as in the foregoings may be further formed an anti fouling layer including an organic silicon compound, which contains fluorine, on the antireflection film for the purpose of improving the water-repelling and oil-repelling performance of the plastic lens surface. As the organic silicon compound that contains fluorine, a fluorine-containing silane compound represented by the following general formula (1) is preferably used.

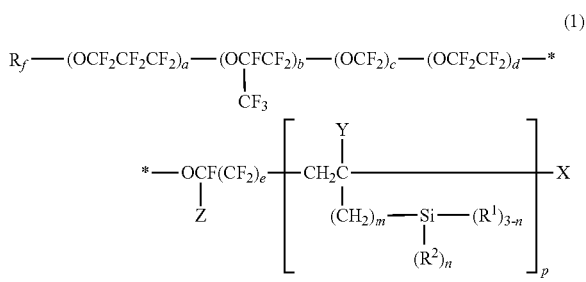

In the general formula (1), $R_f$ represents a straight or branched perfluoroalkyl group having 1 to 16 carbon atoms, and preferably represents $CF_3$—, $C_2F_5$—, or $C_3F_7$—. $R^1$ represents a hydrolyzable group, and preferably represents, for example, halogen, —$OR^3$, —$OCOR^3$, —$OC(R^3)$—$C(R^4)_2$, —$ON=C(R^3)_2$, or —$ON=CR^5$. More preferably, $R^1$ represents chlorine, —$OCH_3$, or —$OC_2H_5$. $R^3$ represents an aliphatic hydrocarbon group or an aromatic hydrocarbon group; $R^4$ represents hydrogen or a lower aliphatic hydrocarbon group; and $R^5$ represents a bivalent aliphatic hydrocarbon group having 3 to 6 carbon atoms.

$R^2$ represents hydrogen or an inert monovalent organic group, and preferably, a monovalent hydrocarbon group having 1 to 4 carbon atoms a, b, c and d are an integer of 0 to 200, and preferably 1 to 50. e represents 0 or 1. m and n are an integer of 0 to 2, and preferably 0. p represents an integer of 1 or greater, and preferably an integer of 1 to 10. Furthermore, the molecular weight may be $5 \times 10^2$ to $1 \times 10^5$, and preferably $5 \times 10^2$ to $1 \times 10^4$.

Additionally, examples of preferable structure of the fluorine-containing silane compound represented by the above general formula (1) include those represented by the following general formula (2).

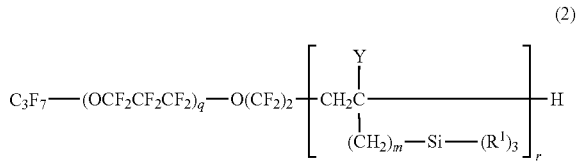

In the general formula (2), Y represents hydrogen or a lower alkyl group; $R^1$ represents a hydrolyzable group; q represents an integer of 1 to 50; m represents an integer of 0 to 2; r represents an integer of 1 to 10.

The fluorine-containing silane compound represented by the general formula (1) or the general formula (2) may be subjected to a process for applying on an antireflection film using a water-repellent treatment liquid prepared by dissolving the compound in an organic solvent thereby adjusting to have a predetermined concentration. Examples of the application process which may be employed include dipping process, spin coat process, spraying process, flow process, doctor blade process, roll coat process, gravure coat painting, curtain flow painting, brush painting and the like.

As the organic solvent, an organic compound having a perfluoro group that is excellent in solubility of fluorine-containing silane compounds and having 4 or more carbon atoms is preferred, and examples thereof include e.g., perfluorohexane, perfluorocyclobutane, perfluorooctane, perfluorodecane, perfluoromethylcyclohexane, perfluoro-1,3-dimethylcyclohexane, perfluoro-4-methoxybutane, perfluoro-4-ethoxybutane and m-xylene hexafluoride. Additionally, perfluoro ether oil or chlorotrifluoroethylene oligomer oil can be used. In addition thereto, flon 225 (mixture of $CF_3CF_2CHCl_2$ and $CClF_2CF_2CHClF$) can be illustrated. These organic solvents can be used alone, or as a mixture of two or more thereof.

The concentration in diluting in an organic solvent preferably falls within the range of 0.03 to 1% by weight. When the concentration is too low, formation of the antifouling layer having a sufficient thickness may be difficult, and thus, sufficient water-repelling and oil-repelling effect may not be achieved. In contrast, when the concentration is too great, antifouling layer may be so thick that the burden in rinse operation for avoiding uneven paint following the application may be possibly increased.

The film thickness of the antifouling layer is not particularly limited, but is preferably 0.001 to 0.5 μm, and more preferably 0.001 to 0.03 μm. When the film thickness of the antifouling layer is too small, the water-repelling and oil-repelling may be inferior. Too great film thickness is not preferred because the surface may be sticky. Also, when the antifouling layer having a thickness of greater than 0.03 μm is not preferred because the antireflection effect may be deteriorated.

When the dipping process is employed as the application process of a water-repellent treatment liquid, the plastic lens is dipped into a water-repellent treatment liquid adjusted to give a predetermined concentration using an organic solvent, and is drawn up at a constant speed after a lapse of a given length of time. In this step, the dipping time period is desirably approximately from 0.5 min to 3 min. When the time period is 0.5 min or shorter, adsorption of the water-repellent agent to the plastic lens surface becomes so insufficient that given water-repelling performance may not be achieved. The time period of 3 min or longer is not preferred because it may lead to increase in the cycle time. The drawing speed is desirably 100 mm/min to 300 mm/min. This may be determined depending on the balance with the concentration of the water-repellent treatment liquid. However, the speed of 100 mm/min or less may result in too thin antifouling layer, which can not achieve a predetermined antifouling performance. In contrast, the speed of 300 mm/min or greater may result in too thick antifouling layer, which may increase the burden in rinse operation for avoiding uneven paint following the application.

Next, Examples and Comparative Examples based on the embodiment of the present invention will be explained.

Example 1

(1) Preparation of Primer Composition

In a stainless vessel were charged 3700 parts by weight of methyl alcohol, 250 parts by weight of water and 1000 parts by weight of propylene glycol monomethyl ether, followed by sufficient stirring. Thereafter, 2800 parts by weight of a composite fine particle sol including titanium oxide, zirconium dioxide, silicon dioxide as principal components (anatase crystal structure, dispersion in methanol, total solid content concentration: 20% by weight, Catalysts & Chemicals Industries Co., Ltd., trade name: Optlake 1120Z U-25·A8) was added thereto and mixed while stirring. Then, after adding 2200 parts by weight of a polyurethane resin thereto followed by mixing while stirring, 2 parts by weight of a silicone surfactant (manufactured by Nippon Unicar Company Limited, trade name: L-7604) was added, followed by keeping stirring over day and night. Thereafter, the mixture was filtrated with a 2 μm filter to give a primer composition.

(2) Preparation of Hard Coat Composition

In a stainless vessel was placed 1000 parts by weight of butyl cellosolve, to which 1200 parts by weight of γ-glycidoxypropyltrimethoxysilane was added. After stirring sufficiently, 300 parts by weight of 0.1 mol/liter hydrochloric acid was added to the mixture followed by keeping stirring over day and night to give a silane hydrolysate. To this silane hydrolysate was added 30 parts by weight of a silicone surfactant (manufactured by Nippon Unicar Company Limited; trade name: L-7001), followed by stirring for 1 hour. Thereafter, 7300 parts by weight of a composite fine particle sol including titanium oxide, tin oxide, silicon dioxide as principal components (rutile crystal structure, dispersion in methanol, manufactured by Catalysts & Chemicals Industries Co., Ltd.; trade name: Optlake 1120Z SRU-25, A17) was added thereto, followed by mixing while stirring for 2 hrs. Then, thereto was added 250 parts by weight of an epoxy resin (manufactured by Nagase Chemicals Ltd., trade name: Denacol EX-313). After stirring the mixture for 2 hrs, 20 parts by weight of iron(III) acetylacetonate was added thereto, followed by stirring for 1 hour. The mixture was filtrated with a 2 μm filter to give a hard coat composition.

(3) Preparation of Coating Composition for Film Having Low Refractive Index

In a stainless vessel was charged 208 parts by weight of tetramethoxysilane, and thereto was added 356 parts by weight of methanol. Further, 18 parts by weight of water and 18 parts of a 0.01 N aqueous hydrochloric acid solution were added thereto, and mixed well using a disper to obtain a mixed solution. This mixed solution was stirred in a 25° C. thermoregulated bath for 2 hrs to give silane hydrolysate. With this silane hydrolysate was blended a hollow silica-isopropanol disperse sol (manufactured by Catalysts & Chemicals Industries Co., Ltd.; solid content concentration: 20%, mean primary particle diameter: 35 nm, shell thickness: 8 nm) in an amount to give the weight ratio to silane hydrolysate of 70/30. Next, after mixing with 1 part by weight a silicone surfactant (manufactured by Nippon Unicar Company Limited, trade name L-7001), the mixture was diluted in propylene glycol monomethyl ether so as to give total solid content of 2%. Accordingly, a coating composition for a film having a low refraction was obtained.

(4) Formation of Primer Layer, Hard Coat Layer, Antireflection Film

A thiourethane based plastic lens substrate (manufactured by Seiko Epson Corporation, trade name: Seiko Super Sovereign base, refractive index: 1.67) was provided.

Then, thus provided lens substrate was subjected to an alkali treatment (washing with pure water after dipping in a 2.0 N aqueous potassium hydroxide solution kept at 50° C. for 5 min, and then neutralizing by dipping in a 0.5 N sulfuric acid kept at 25° C. for 1 min), followed by washing with pure water and drying, and standing to cool. Then, thus treated lens substrate was dipped in a primer composition prepared as in section (1), and drawn up at a drawing speed of 30 cm/min, which was then baked at 80° C. for 20 min to form a primer layer on the lens substrate surface. Thereafter, the lens substrate having thus formed primer layer was dipped in a hard coat composition prepared as in section (2), and drawn up at a drawing speed of 30 cm/min, which was then baked at 80° C. for 30 min to form a hard coat layer on the primer layer. Thereafter, it was heated in an oven preset at 125° C. for 3 hrs to obtain a plastic lens having thus formed primer layer and hard coat layer. The formed primer layer had a film thickness of 0.5 μm, and the hard coat layer had a film thickness of 2.5 μm.

Then, after subjecting the plastic lens having thus formed primer layer and hard coat layer to a plasma treatment (ambient air plasma), it was dipped in a coating composition for a film having a low refractive index prepared as in section (3). After drawing up at a drawing speed of 5 cm/min, and baking by heating at 80° C. for 30 min, it was heated in an oven preset at 100° C. for 2 hrs to form an antireflection film composed of a film having a low refractive index to give a plastic lens having thus formed primer layer, hard coat layer, and antireflection film. The formed antireflection film had a film thickness of 100 nm.

Example 2

A plastic lens having a primer layer, a hard coat layer, and an antireflection film formed thereon was obtained according to a similar method of the production to Example 1 using a hard coat composition and a coating composition for a film having a low refractive index which are similar to those in Example 1 except that a polyester resin was used in place of the organic resin polymer of the primer composition used in forming the primer layer in Example 1, and that a composite fine particle sol including titanium oxide, zirconium dioxide and silicon dioxide as principal components (anatase crystal structure, dispersion in methanol, total solid content: 20% by weight, manufactured by Catalysts & Chemicals Industries Co., Ltd., trade name: Optlake 1120Z U-25·G) for the metal oxide fine particle.

Example 3

A plastic lens having a primer layer, a hard coat layer, and an antireflection film formed thereon was obtained according to a similar method of the production to Example 1 using a hard coat composition and a coating composition for a film having a low refractive index which are similar to those in Example 1 except that a polyester resin was used in place of the organic resin polymer of the primer composition used in forming the primer layer in Example 1, and that a composite fine particle sol including titanium oxide, tin oxide and silicon dioxide as principal components (rutile crystal structure, dispersion in methanol, total solid content: 20% by weight, manufactured by Catalysts & Chemicals Industries Co., Ltd., trade name; Optlake 1120Z U-25·A17) for the metal oxide fine particle.

Example 4

A plastic lens having a primer layer, a hard coat layer, and an antireflection film formed thereon was obtained according to a similar method of the production to Example 1 using a hard coat composition and a coating composition for a film having a low refractive index which are similar to those in Example 1 except that a polyester resin was used in place of the organic resin polymer of the primer composition used in forming the primer layer in Example 1, and that a composite fine particle sol including titanium oxide, tin oxide and silicon dioxide as principal components (rutile crystal structure, dispersion in methanol, total solid content: 20% by weight, manufactured by Catalysts & Chemicals Industries Co., Ltd., trade name: Optlake 1120Z U-25 (G) for the metal oxide fine particle.

Comparative Example 1

A hard coat layer and an antireflection film were formed according to a similar method of the production to Example 1 using a coating composition for a film having a low refractive index which is similar to that in Example 1 except that the primer layer was not formed in Example 1, and the hard coat composition as shown below was prepared and a hard coat layer was formed directly on the plastic lens substrate surface.

(1) Preparation of Hard Coat Composition

In a stainless vessel was placed 1000 parts by weight of butyl cellosolve, to which 1200 parts by weight of γ-glycidoxypropyltrimethoxysilane was added. After stirring sufficiently, 300 parts by weight of 0.1 mol/liter hydrochloric acid was further added to the mixture followed by keeping stirring over day and night to give a silane hydrolysate. To this silane hydrolysate was added 30 parts by weight of a silicone surfactant (manufactured by Nippon Unicar Company Limited, trade name: L-7001), followed by stirring 1 hour. Thereafter, 7300 parts by weight of a composite fine particle sol including titanium oxide, tin oxide, silicon dioxide as principal components (manufactured by Catalysts & Chemicals Industries Co., Ltd., trade name: Optlake 1120Z 8RU-25·A17) was added thereto, followed by mixing while stirring for 2 hrs. Then, thereto was added 250 parts by weight of an epoxy resin (manufactured by Nagase Chemicals Ltd., trade name: Denacol EX-313). After stirring the mixture for 2 hrs, 20 parts by weight of iron(III) acetylacetonate was added thereto, followed by stirring for 1 hour. The mixture was filtrated with a 2 μm filter to give a hard coat composition.

(2) Formation of Hard Coat Layer, Antireflection Film

A thiourethane based plastic lens substrate (manufactured by Seiko Epson Corporation, trade name: Seiko Super Sovereign base, refractive index: 1.67) was provided.

Then, thus provided lens substrate was subjected to an alkali treatment (washing with pure water after dipping in a 2.0 N aqueous potassium hydroxide solution kept at 50° C. for 5 min, and then neutralizing by dipping in a 0.5 N sulfuric acid kept at 25° C. for 1 min), followed by washing with pure water and drying, and standing to cool. Then, the lens substrate was dipped in a hard coat composition prepared as in section (1), and drawn up at a drawing speed of 30 cm/min, which was then baked at 80° C. for 30 min. Thereafter, it was heated in an oven preset at 125° C. for 3 hrs to form a hard coat layer on the lens substrate surface. Then, after subjecting the plastic lens having thus formed hard coat layer thereon to a plasma treatment, an antireflection film composed of a film having a low refractive index was formed on the hard coat layer to obtain a plastic lens having thus formed hard coat layer and antireflection film thereon. Thus formed hard coat film had a film thickness of 2.5 µm.

Comparative Example 2

A plastic lens having a primer layer, a hard coat layer, and an antireflection film formed thereon was obtained according to a similar method of the production to Example 1 using a primer composition, a hard coat composition and a coating composition for a film having a low refractive index which are similar to those in Example 1 except that a composite fine particle sol including titanium oxide, zirconium dioxide and silicon dioxide as principal components (anatase crystal structure, dispersion in methanol, total solid content; 20% by weight, manufactured by Catalysts & Chemicals Industries Co., Ltd., trade name: Optlake 1120Z U-25·A8) was used for the metal oxide fine particle used in forming the hard coat layer in Example, in place of the composite fine particle sol including titanium oxide, tin oxide and silicon dioxide as principal components.

Comparative Example 3

A plastic lens having a primer layer, a hard coat layer, and an antireflection film formed thereon was obtained through forming primer layer and a hard coat layer according to a similar method of the production to Example 1 using a primer composition and a hard coat composition which are similar to those in Example 1 except that formation of the antireflection film in Example 1 was perfected by vacuum evaporation of an inorganic substance in place of the application of the coating composition for a film having a low refractive index. In the formation of the antireflection film, a plastic lens having the formed primer layer and hard coat layer was first placed in a vacuum evaporation apparatus, heated at 85° C. while evacuating the air, and subjected to an ion gun treatment (carrier gas: oxygen, voltage: 400 eV, treatment time: 30 sec). Then after keeping on evacuating the air until the degree of vacuum became $5.0 \times 10^{-5}$ mbar, vapor deposition of the vapor deposition material was permitted by a electron beam heating process. Accordingly, an antireflection film composed of 7 layers of $SiO_2$ (30 nm)/$TiO_2$ (20 nm)/$SiO_2$ (35 nm)/$TiO_2$ (55 nm)/$SiO_2$ (20 nm)/$TiO_2$ (35 nm)/$SiO_2$ (95 nm), in this order from the hard coat film side was formed.

Physical properties of the plastic lens (hereinafter, referred to as lens) obtained in the foregoing Examples 1 to 4, and Comparative Examples 1 to 3 were evaluated according to the method of evaluation as presented below. The results are shown in Table 1. The evaluation items were 10 items of: interference fringe, reflectance, scuff resistance, initial adhesiveness, moisture resistance, hot water resistance, light resistance, alkali resistance, heat resistance and impact resistance. Each evaluation method will be explained below.

(1) Interference Fringe

The lens was held immediately below a three-wavelength fluorescent lamp, and the occurrence status of the interference fringe on the lens surface was visually observed. Thus, the lens with almost no interference fringe was decided as A, while the lens with distinctly found interference fringe was decided as B to make the evaluation.

(2) Reflectance

Transmittance of the lens was measured using a spectrophotometer, and converted into the corrected transmittance the luminosity according to a luminosity curve obtained by the measurement.

(3) Scuff Resistance

Steel wool #0000 was impressed under a load of 1 kg on the lens surface, and after rubbing on a stretch of 3 to 4 cm back-and-forth 10 times with the steel wool, the state of scuff got on the lens surface was visually evaluated according to the standard involving the following A to E ranks.

A: No scuff is found at all.
B: 1 to 5 streaks of scuff are found.
C: 6 to 20 streaks of scuff are found.
D: 21 or more streaks of scuff are found, but frosted appearance is not observed.
E: many streaks of scuff are found, with almost frosted appearance found.

(4) Initial Adhesiveness

The lens surface was cross-cut to provide 100 grids with about 1 mm intervals. To thus cross-cut part was strongly stuck an adhesive tape (manufactured by Nichiban Co., Ltd., trade name: Sellotape®), and then the adhesive tape was quickly stripped. The state of film stripping was evaluated according to the following 5 ranks of "a" to "e" on the grid after stripping the adhesive tape.

a: No film stripping was caused at all (number of parts in grid exhibiting film stripping=0/100).
b: Film stripping was scarcely caused (number of parts in grid exhibiting film stripping=1 to 5/100).
c: Film stripping was caused to some extent (number of parts in grid exhibiting film stripping=6 to 20/100).
d: Film stripping was caused (number of parts in grid exhibiting film stripping=21 to 50/100).
e: Defective adhesion (number of parts in grid exhibiting film stripping=51 to 100/100).

(5) Moisture Resistance

The lens was left to stand in a chamber with constant temperature and humidity (40° C., 90 RH %) for 10 days, and thereafter removed from the chamber. After leaving to stand at room temperature for 3 hrs, an adhesiveness test was performed. The adhesiveness test was performed according to the same process and same evaluation standard as in the above item (4) Initial Adhesiveness. Evaluation was made on all tinted lens, i.e., the plastic lens which had been previously tinted, as the lens for the moisture resistance test. The tinted lens was obtained by providing a tint pot including 2 g of a dye, gray D, for Seiko Plux Diamond Coat dispersed in a hot water bath of 1 liter of 95° C. pure water, and dipping the plastic lens in the tint pot for 10 min. Thereafter, the plastic lens was removed from the tint pot, and cleaned by wiping using acetone. The primer layer, the hard coat layer and the antireflection film were formed according to the process demonstrated in each Example and Comparative Example.

(6) Hot Water Resistance

The lens was dipped in 80° C. hot water for 2 hrs, and thereafter, the lens was removed from the hot water. After cooling with water, an adhesiveness test was performed. The adhesiveness test was performed according to the same process and same evaluation standard as in the above item (4) Initial Adhesiveness. Evaluation was made on all tinted lens, i.e., the plastic lens which had been previously tinted, as the lens for the hot water resistance test (with respect to the process for tinting, see, the above item (5) Moisture Resistance).

(7) Light Resistance

The lens was irradiated with a xenon long life weather meter (manufactured by Suga Test Instruments Co., Ltd.) for 200 hrs. After removing the lens from the xenon long life weather meter and cooling with water, an adhesiveness test was performed. The adhesiveness test was performed according to the same process and same evaluation standard as in the above item (4) Initial Adhesiveness. Evaluation was made on all tinted lens, i.e., the plastic lens which had been previously tinted, as the lens for the light resistance test (with respect to the process for tinting, see, the above item (5) Moisture Resistance).

(8) Alkali Resistance

The lens was dipped in a 10% by weight aqueous sodium hydroxide solution at 20° C. for 30 min. After removing the lens and washing it with water, an adhesiveness test was performed. The adhesiveness test was performed according to the same process and same evaluation standard as in the above item (4) Initial Adhesiveness.

(9) Heat Resistance

After subjecting the lens to edging to conform to a spectacle frame shape, it was mounted into the spectacle frame, fastened perfectly with a screw, and put into a 60° C. thermoregulated bath. Thereafter, the lens was removed, and left to cool at room temperature for 1 hour. Then, the presence of crack generation was evaluated. When any crack was not generated, the lens was additionally put into a 65° C. thermoregulated bath for 30 min. Then, the presence of crack generation was evaluated. Thereafter, the lens was additionally put into a thermoregulated bath having a higher temperature by 5° C. in succession for each 30 min, the temperature at which the crack was generated was decided as the allowable temperature limit.

(10) Impact Resistance

Evaluation was made when a 16.3 g rigid sphere was allowed to fall plumb down from the position at a height of 127 cm on the lens surface. The lens which was not broken was decided as A, while one broken or penetrated was decided as B.

To the contrary, because the primer layer was not formed in Comparative Example 1, therefore, the light resistance and the impact resistance were insufficient. Moreover, in Comparative Example 2, metal oxide fine particles including titanium oxide having an anatase crystal structure were used in the hard coat composition, therefore, the light resistance was particularly insufficient. Still further, since an inorganic multilayer film was formed as the antireflection film by vacuum evaporation in Comparative Example 3, the heat resistance was insufficient.

The invention explained hereinabove is applicable to any plastic lens without limitation. Examples of the optical component include optical lenses such as e.g., spectacle lenses, camera lenses, lenses for telescopes, lenses for microscopes and condensing lenses for steppers.

What is claimed is:

1. A plastic lens comprising a plastic lens substrate and a hard coat layer on the plastic lens substrate, and an organic antireflection film on the hard coat layer, the plastic lens substrate including at least a sulfur atom, wherein the plastic lens substrate comprises a thiourethane based resin and/or an episulfide based resin, and wherein the plastic lens substrate is tinted, the hard coat layer being a coating film formed with a coating composition which includes at least the following Component A and Component B, the organic antireflection film being a coating film which includes at least the following Component C and Component D, and has a refractive index that is lower than the refractive index of the hard coat layer by 0.10 or more, and the plastic lens including a primer layer between the plastic lens substrate and the hard coat layer:

Component A: metal oxide fine particles including titanium oxide having a rutile crystal structure, wherein the titanium oxide is a composite oxide with tin oxide and silicon dioxide, Component B: an organic silicon compound represented by the general formula: $R^1SiX^1_3$ (wherein, $R^1$ represents

TABLE 1

|  | Interference fringe | Transmittance (%) | scuff resistance | Initial adhesiveness | Moisture resistance | Hot water resistance | Light resistance | Alkali resistance | Heat resistance (° C.) | Impact resistance |
|---|---|---|---|---|---|---|---|---|---|---|
| Example 1 | A | 98.5 | A | a | b | b | b | b | 105 | A |
| Example 2 | A | 98.6 | A | a | a | a | b | a | 105 | A |
| Example 3 | A | 98.5 | A | a | b | b | a | b | 105 | A |
| Example 4 | A | 90.4 | A | a | a | a | a | a | 105 | A |
| Comparative Example 1 | A | 90.5 | A | a | a | a | e | b | 105 | B |
| Comparative Example 2 | A | 98.5 | A | a | d | c | e | b | 105 | A |
| Comparative Example 3 | A | 98.3 | A | a | a | b | a | a | 70 | A |

From the results shown in Table 1, Examples 1 to 4 in which the primer layer was formed between the lens substrate and the hard coat layer exhibited excellent durability (adhesiveness). Additionally, in Examples 2 and 4 a polyester resin for the primer composition, and metal oxide fine particles treated with an organic silicon compound having an epoxy group on the outermost face of metal oxide fine particles were used in combination. Therefore, the moisture resistance and the hot water resistance were particularly improved. Furthermore, in Examples 3 and 4, metal oxide fine particles including titanium oxide having a rutile crystal structure were used, therefore, the light resistance was particularly improved.

an organic group having a polymerizable reactive group and having two or more carbon atoms; and $X^1$ represents a hydrolytic group), Component C: an organic silicon compound represented by the general formula: $R^2_nR^3_mSiX^2_{4-n-m}$ (wherein, $R^2$ represents an organic group having a polymerizable reactive group; $R^3$ represents a hydrocarbon group having 1 to 6 carbon atoms; $X^2$ represents a hydrolytic group; n represents 0 or 1; and m represents 0 or 1; and where n or m cannot be 0 at the same time), and Component D: silica fine particles having a mean particle diameter of 1 to 150 nm and having voids inside thereof;

wherein the primer layer is a coating film formed with a coating composition including the following Component E and Component F:

Component E: an organic resin polymer having a polar group, and

Component F: metal oxide fine particles including titanium oxide, wherein the titanium oxide is a composite oxide with tin oxide and silicon dioxide.

2. The plastic lens according to claim 1, wherein the Component E is a polyester resin.

3. The plastic lens according to claim 1, wherein
the primer layer comprises metal oxide fine particles prepared by subjecting the surface of the Component F to a modifying treatment with an organic silicon compound having an epoxy group.

4. The plastic lens according to claim 1, wherein the organic antireflection film comprises the top most layer of said plastic lens.

5. The plastic lens according to claim 4, wherein the organic antireflection film has a top surface and a bottom surface.

6. The plastic lens according to claim 5, wherein the bottom surface of the organic antireflection film directly contacts the hard coat layer.

7. The plastic lens according to claim 1, wherein the layer directly contacting the hard coat layer is the bottom surface of the organic antireflection film.

8. The plastic lens according to claim 1, wherein the silica fine particles have a mean particle diameter of 20 to 150 nm.

9. A method of manufacturing a plastic lens comprising:
obtaining a plastic lens substrate by cast polymerization of a polymerizable composition including a monomer having a sulfur atom in the molecule; wherein the plastic lens substrate comprises a thiourethane based resin and/or an episulfide based resin, and wherein the plastic lens substrate is tinted,
forming a primer layer on the plastic lens substrate;
forming a hard coat layer on the primer layer using a coating composition including at least the following Component A and Component B; and
forming on the hard coat layer an organic antireflective layer having a refractive index that is lower than the refractive index of the hard coat layer by 0.10 or more using a coating composition including at least the following Component C and Component D:

Component A: metal oxide fine particle including titanium oxide having a rutile crystal structure, wherein the titanium oxide is a composite oxide with tin oxide and silicon dioxide, Component B: organic silicon compound represented by the general formula: $R^1SiX^1_3$ (wherein, $R^1$ represents an organic group having a polymerizable reactive group and having two or more carbon atoms, $X^1$ represents a hydrolytic group), Component C: organic silicon compound represented by the general formula: $R^2_n R^3_m SiX^2_{4-n-m}$ (wherein, $R^2$ represents an organic group having a polymerizable reactive group; $R^3$ represents a hydrocarbon group having 1 to 6 carbon atoms; $X^2$ represents a hydrolytic group; n represents 0 or 1, and m represents 0 or 1; and where n or m cannot be 0 at the same time), and Component D: silica fine particles having a mean particle diameter of 1 to 150 nm and having voids inside thereof;

wherein Component B an Component C are hydrolyzed, wherein said primer layer is a coating film formed with a coating composition including the following Component E and Component F:

Component E: an organic resin polymer having a polar group, and

Component F: metal oxide fine particles including titanium oxide, wherein the titanium oxide is a composite oxide with tin oxide and silicon dioxide.

10. A method of manufacturing a plastic lens according to claim 9, wherein the organic antireflection film comprises the top most layer of said plastic lens.

11. A method of manufacturing a plastic lens according to claim 10, wherein the organic antireflection film has a top surface and a bottom surface.

12. A method of manufacturing a plastic lens according to claim 11, wherein the bottom surface of the organic antireflection film directly contacts the hard coat layer.

13. A method of manufacturing a plastic lens according to claim 9, wherein the layer directly contacting the hard coat layer is the bottom surface of the organic antireflection film.

14. The method according to claim 9, wherein the silica fine particles have a mean particle diameter of 20 to 150 nm.

* * * * *